(12) United States Patent
Yang et al.

(10) Patent No.: US 11,227,093 B2
(45) Date of Patent: Jan. 18, 2022

(54) METHOD AND SYSTEM OF FORMING SEMICONDUCTOR DEVICE

(71) Applicant: TAIWAN SEMICONDUCTOR MANUFACTURING COMPANY LTD., Hsinchu (TW)

(72) Inventors: Kuo-Nan Yang, Hsinchu (TW); Wan-Yu Lo, Taoyuan County (TW); Chung-Hsing Wang, Hsinchu County (TW); Hiranmay Biswas, Kolkata (IN)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/157,765

(22) Filed: Jan. 25, 2021

(65) Prior Publication Data

US 2021/0150117 A1    May 20, 2021

Related U.S. Application Data

(63) Continuation of application No. 15/933,771, filed on Mar. 23, 2018, now Pat. No. 10,922,470.

(60) Provisional application No. 62/590,869, filed on Nov. 27, 2017.

(51) Int. Cl.
*G06F 30/398* (2020.01)
*G06F 30/392* (2020.01)
*G06F 30/394* (2020.01)

(52) U.S. Cl.
CPC .......... *G06F 30/398* (2020.01); *G06F 30/392* (2020.01); *G06F 30/394* (2020.01)

(58) Field of Classification Search
CPC ..................................................... G06F 30/398
USPC ......................................................... 716/134
See application file for complete search history.

(56) References Cited

U.S. PATENT DOCUMENTS

| 6,591,407 B1 * | 7/2003 | Kaufman | ................ G06F 30/39 |
| | | | 716/114 |
| 2015/0269302 A1 * | 9/2015 | Katta | .................... G06F 30/398 |
| | | | 716/120 |

* cited by examiner

*Primary Examiner* — Eric D Lee
(74) *Attorney, Agent, or Firm* — WPAT, P.C., Intellectual Property Attorneys; Anthony King

(57) ABSTRACT

A method of forming a semiconductor device includes: providing a first circuit having a plurality of circuit cells; analyzing a loading capacitance on a first pin cell connecting a first circuit cell and a second circuit cell in the plurality of circuit cells to determine if the loading capacitance of the first pin cell is larger than a first predetermined capacitance; replacing the first pin cell by a second pin cell for generating a second circuit when the loading capacitance is larger than the first predetermined capacitances, wherein the second pin cell is different from the first pin cell; and generating the semiconductor device according to the second circuit.

20 Claims, 10 Drawing Sheets

METHOD AND SYSTEM OF FORMING SEMICONDUCTOR DEVICE

CROSS-REFERENCE TO RELATED APPLICATION

This application is a continuation of U.S. application Ser. No. 15/933,771, filed on Mar. 23, 2018, which claims the benefit of U.S. Provisional Application No. 62/590,869, filed on Nov. 27, 2017, which are incorporated by reference in their entirety.

BACKGROUND

Electromigration (EM) is the transport of metal atoms when an electric current flows through a metallic structure in an integrated circuit (IC). For instance, EM can cause metal atoms to be removed from a portion of a metal trace thereby creating a void and possibly an open-circuit failure in the integrated circuit. Traditional EM analysis has focused on higher metal layers that connect the cells together. However, with shrinking wire dimensions and increasing currents, the current densities in lower metal layers within the cells are also now in the range where EM effects are visible. To avoid EM effect, some may over-design cell by putting much BEOL resource for cell EM signoff, and this turns in poor routing and impact Power Performance Area (PPA) result.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
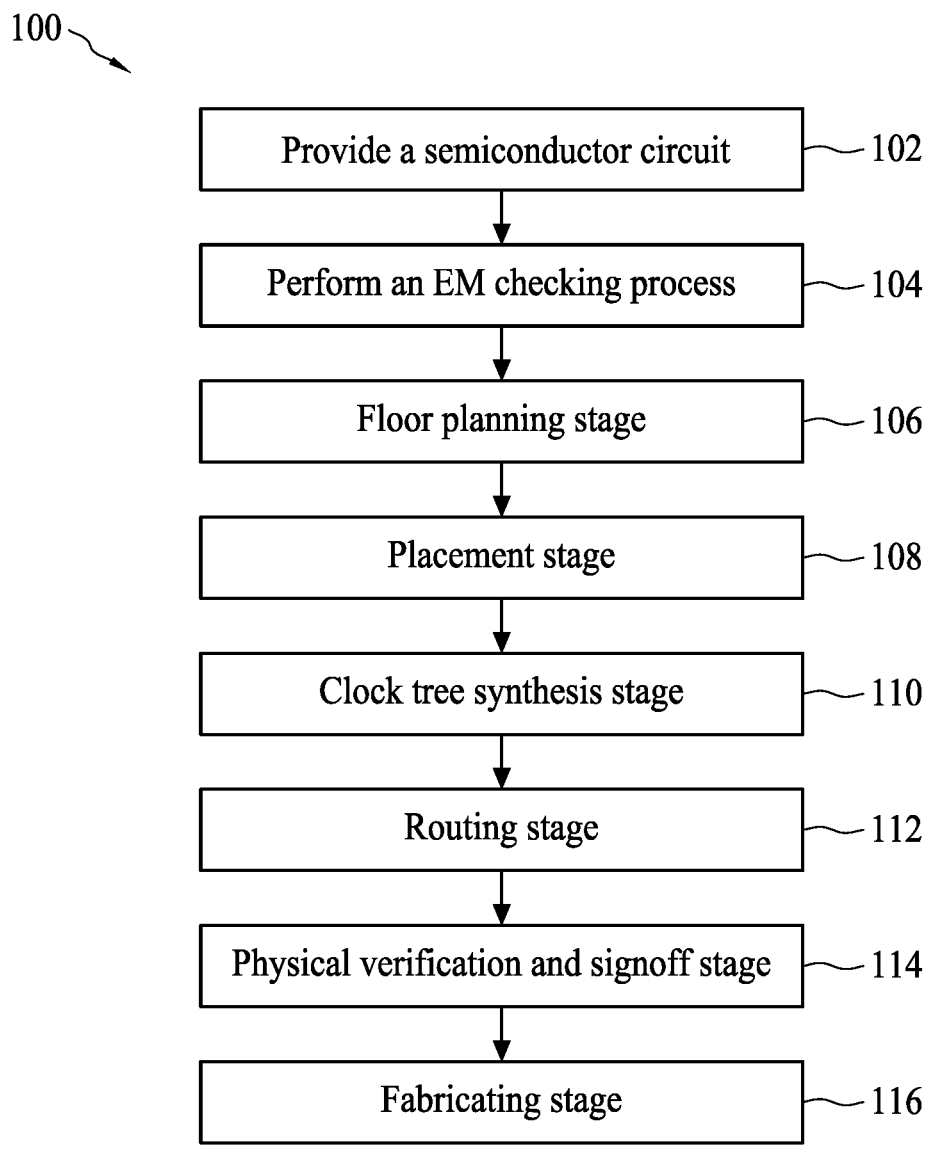
FIG. 1 is a flowchart of a fabricating flow for forming a semiconductor device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flowchart of a fabricating flow 100 for forming a semiconductor device or an IC (Integrated Circuit) chip in accordance with some embodiments. The fabricating flow 100 utilizes at least one electronic design automation (FDA)

tool and at least one fabrication tool to carry out one or more operations in the flow 100. During the Automatic Placement and Routing (APR) flow, there would be EM violation when the loading capacitance of an output pin of a cell exceeds the maximum tolerable capacitance of the output pin, or there would be over-design cell by putting too much pins on the output pin. According to some embodiments, the output pin a cell is assigned to the appropriate output pin cell based on the loading capacitance to alleviate the EM phenomenon and obtain better PPA result with reduced pin density.

At a synthesis stage 102, a high-level design of an IC chip is provided by a circuit designer. In some embodiments, a semiconductor circuit is generated through the logic synthesis based on the high-level design and gates in the semiconductor circuit are mapped to available cells in a standard cell library. The semiconductor circuit may be a gate-level netlist. The term "netlist" used herein refers to both graphical-based representation such as a schematic and/or a text-based representation of a circuit. During the synthesis stage, the RTL (Register Transfer Level) design is converted to gate-level descriptions. The gate-level netlist contains information of the cells, the corresponding interconnections, the area, and other details. The cells may be various standard cells selected from the standard cell library. In addition, during the synthesis stage, constraints may be applied to ensure that the gate-level design meets the required functionality and speed.

At a cell replacement stage 104, an electronmigration (EM) checking process is performed upon the cells in the semiconductor circuit. During the EM checking process, the cell(s) that violates the EM rules is highlighted. The highlighted cell may be replaced by a new output pin cell selected from the standard cell library to form a modified semiconductor circuit. The EM phenomenon of the modified semiconductor circuit is alleviated. The replacement may be performed automatically or manually.

At a floor planning stage 106, the modified semiconductor circuit is partitioned into functional blocks and a floorplan for the functional blocks in a design layout of the IC chip is created. The floor planning stage is the process of identifying structures that can be placed close together, and allocating space for the structures to meet the required area and performance, for example, of the design layout. The floor planning stage takes into account the macros, memory, and/or other IP cores used in the design layout. The floor planning stage also takes into account the corresponding placement of the circuit blocks used in the design layout. According to some embodiments, the floor planning stage determines the IO structure and aspect ratio of the design layout.

At a placement stage 108, mapped cells of logic gates and registers of the circuit blocks are placed at specific locations in the design layout.

At a clock tree synthesis (CTS) stage 110, a CTS tool may automatically designs a clock tree for distributing a clock signal to a plurality of clocked devices such as flip-flops, registers, and/or latches that change state in response to clock signal pulses. The CTS tool may lay out the conductors forming the clock tree in a way that tries to equalize the distance the clock signal travelling to each clocked device from an IC input terminal receiving the clock signal from an external source. The CTS tool may place buffers or amplifiers at branch points of the tree sized as necessary to drive all of the buffers or clocked devices downstream of the branch point. Based on an estimate of the signal path delay in each branch of the clock tree, the CTS tool may balance the clock tree by inserting addition buffers in selected branches of the clock tree to adjust the path delays within those branches to ensure that the clock tree will deliver each clock signal pulse to every clocked device at nearly the same time.

At a routing stage 112, signal nets are routed. Routing of signal nets comprises the placement of signal net wires on a metal layer within placed standard cells to carry non-power signals between different functional blocks.

At a physical verification and signoff stage 114, layout-versus-schematic (LVS) is performed on a physical netlist generated from the design layout to ensure correspondence of the design layout to the semiconductor circuit. Further, design rule check (DRC) is performed on the design layout to ensure the design clean of, for example, electrical issues and lithographic issues for manufacturing. Incremental fixing can be performed to achieve final signoff of the IC chip design before tape-out.

At a fabricating stage 116, a fabricating tool receives a GDS file corresponding to the IC chip for fabrication. The GDS file is a graphical representation of the integrated chip that can be subsequently used for making photomasks used in the IC fabrication process. In the fabricating stage 116, a semiconductor device corresponding to the GDS file is generated.

Figure 2:
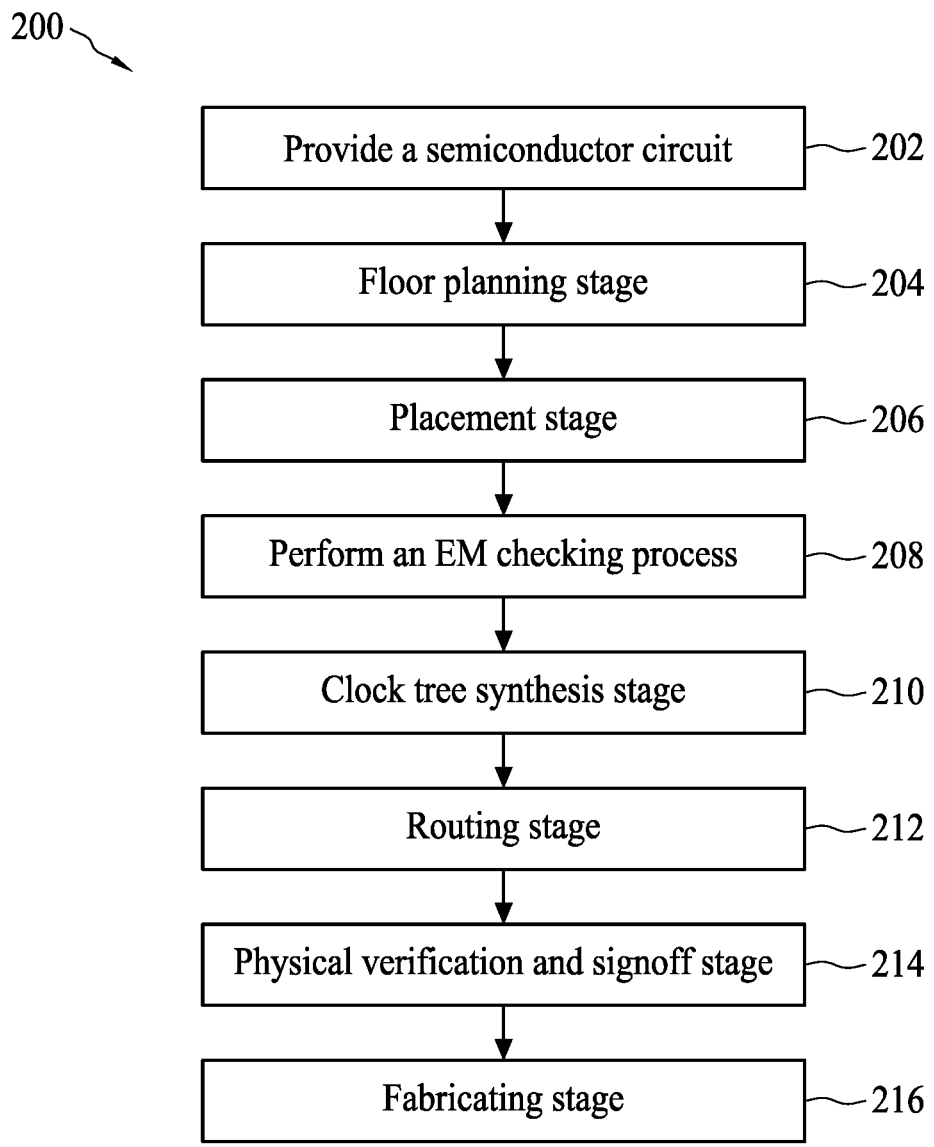
FIG. 2 is a flowchart of another fabricating flow for forming a semiconductor device in accordance with some embodiments.

In the fabricating flow 100, the EM checking process is performed after the synthesis stage 102 and before the floor planning stage 106. This is not a limitation of the present embodiment. The EM checking process may be performed after the placement stage 108 and before the CTS stage 110. FIG. 2 is a flowchart of a fabricating flow 200 for forming an IC chip in accordance with some embodiments.

At a synthesis stage 202, a high-level design of an IC chip is provided by a circuit designer. In some embodiments, a semiconductor circuit is generated through the logic synthesis based on the high-level design and gates in the semiconductor circuit are mapped to available cells in a standard cell library.

At a floor planning stage 204, the semiconductor circuit is partitioned into functional blocks and a floorplan for the functional blocks in a design layout of the IC chip is created.

At a placement stage 206, mapped cells of logic gates and registers of the circuit blocks are placed at specific locations in the design layout. A modified semiconductor circuit is generated in the placement stage 206.

At a cell replacement stage 208, an EM checking process is performed upon the cells in the semiconductor circuit. During the EM checking process, the cell(s) that violates the EM rules is highlighted. The highlighted cell may be replaced by a new output pin cell selected from the standard cell library to form a modified semiconductor circuit. The EM phenomenon of the modified semiconductor circuit is alleviated. The replacement may be performed automatically or manually.

At a CTS stage 210, a CTS tool may automatically designs a clock tree for distributing a clock signal to a plurality of clocked devices such as flip-flops, registers, and/or latches that change state in response to clock signal pulses.

At a routing stage 212, signal nets are routed. Routing of signal nets comprises the placement of signal net wires on a metal layer within placed standard cells to carry non-power signals between different functional blocks.

At a physical verification and signoff stage 214, layout-versus-schematic (LVS) is performed on a physical netlist generated from the design layout to ensure correspondence of the design layout to the semiconductor circuit. Further, design rule check (DRC) is performed on the design layout to ensure the design clean of, for example, electrical issues and lithographic issues for manufacturing.

At a fabricating stage 216, a fabricating tool receives a GDS file corresponding to the IC chip for fabrication. In the fabricating stage 216, a semiconductor device corresponding to the GDS file is generated.

Figure 3:
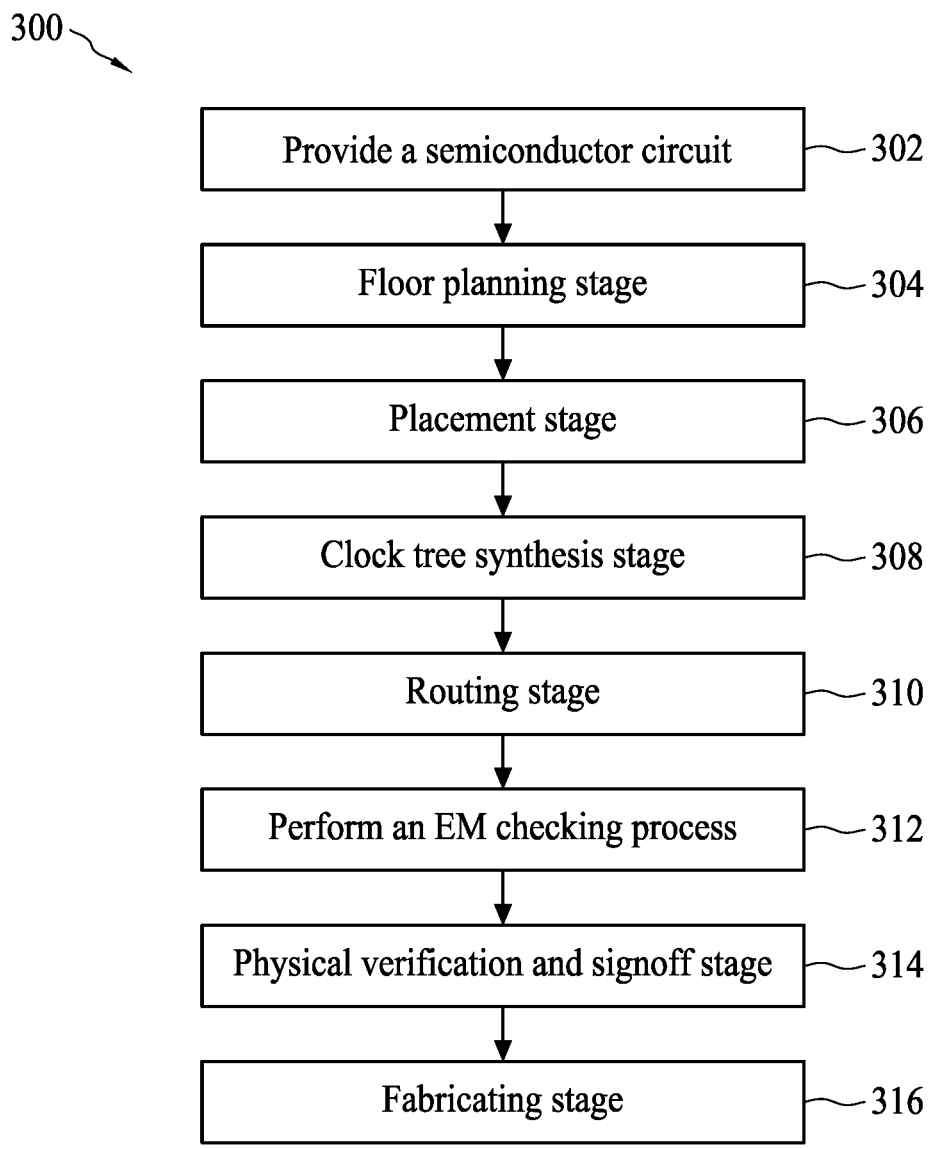
FIG. 3 is a flowchart of another fabricating flow for forming a semiconductor device in accordance with some embodiments.

In the fabricating flow 200, the EM checking process is performed after the placement stage 206 and before the CTS stage 210. This is not a limitation of the present embodiment. The EM checking process may be performed after the routing stage 212. FIG. 3 is a flowchart of a fabricating flow 300 for forming an IC chip in accordance with some embodiments.

At a synthesis stage 302, a high-level design of an IC chip is provided by a circuit designer. In some embodiments, a semiconductor circuit is generated through the logic synthesis based on the high-level design and gates in the semiconductor circuit are mapped to available cells in a standard cell library.

At a floor planning stage 304, the semiconductor circuit is partitioned into functional blocks and a floorplan for the functional blocks in a design layout of the IC chip is created.

At a placement stage 306, mapped cells of logic gates and registers of the circuit blocks are placed at specific locations in the design layout.

At a CTS stage 308, a CTS tool may automatically designs a clock tree for distributing a clock signal to a plurality of clocked devices such as flip-flops, registers, and/or latches that change state in response to clock signal pulses.

At a routing stage 310, signal nets are routed. Routing of signal nets comprises the placement of signal net wires on a metal layer within placed standard cells to carry non-power signals between different functional blocks. A modified semiconductor circuit is generated in the placement stage 310.

At a cell replacement stage 312, an EM checking process is performed upon the cells in the semiconductor circuit. During the EM checking process, the cell(s) that violates the EM rules is highlighted. The highlighted cell may be replaced by a new output pin cell selected from the standard cell library to form a modified semiconductor circuit. The EM phenomenon of the modified semiconductor circuit is alleviated. The replacement may be performed automatically or manually.

At a physical verification and signoff stage 314, layout-versus-schematic (LVS) is performed on a physical netlist generated from the design layout to ensure correspondence of the design layout to the semiconductor circuit. Further, design rule check (DRC) is performed on the design layout to ensure the design clean of, for example, electrical issues and lithographic issues for manufacturing.

At a fabricating stage 316, a fabricating tool receives a GDS file corresponding to the IC chip for fabrication. In the fabricating stage 316, a semiconductor device corresponding to the GDS file is generated.

Figure 4:
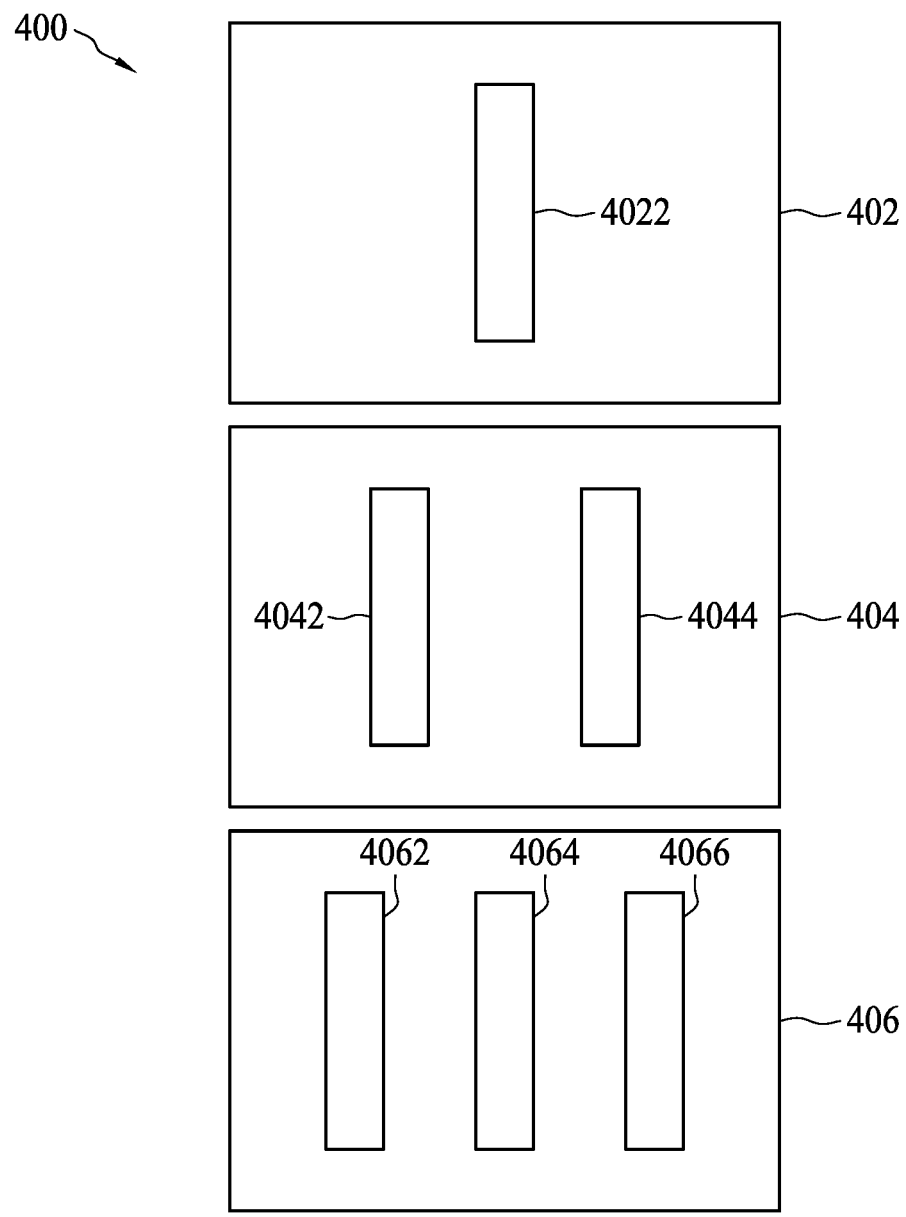
FIG. 4 is a diagram illustrating a library in accordance with some embodiments.

During the cell replacement stages 104, 208, or 312, each of the cells in the semiconductor circuit is checked by the EM checking process. According to some embodiments, a library comprising a plurality of different output pin cells is provided. The library may be pre-stored in a storage unit. FIG. 4 is a diagram illustrating the library 400 in accordance with some embodiments. The library 400 comprises a plurality of output pin cells with different pin configurations. According to some embodiments, each of the output pin cells comprises at least one standard output pin. When the output pin cell comprises more than one standard output pins, the standard output pins are arranged to be parallel pins. However, this is not a limitation of the present embodiment. In addition, the plurality of standard output pins within one output pin cell are electrically connected with each other. In other words, the plurality of standard output pins in one output pin cell are must-joint output pins. Moreover, the plurality of standard output pins within one output pin cell are formed on the same metal layer. For example, the plurality of standard output pins within one output pin cell may be formed on the first metal layer M0, the second metal layer M1, the second metal layer M2, or the higher metal layer on the semiconductor substrate.

For descriptive purpose, the library 400 in FIG. 4 merely shows three different output pin cells 402, 404, and 406. This is not a limitation of the present embodiment. The first output pin cell 402 comprises a single standard output pin 4022. The second output pin cell 404 comprises a first standard output pin 4042 and a second standard output pin 4044. The second output pin cell 404 is a dual must-joint pins. The first standard output pin 4042 and the second standard output pin 4044 are two parallel pins. The third output pin cell 406 comprises a first standard output pin 4062, a second standard output pin 4064, and a third standard output pin 4066. The third output pin cell 406 is a triple must-joint pins. The first standard output pin 4062, the second standard output pin 4064, and the third standard output pin 4066 are three parallel pins. In addition, for the second output pin cell 404, the first standard output pin 4042 is electrically connected with the second standard output pin 4044. For the third output pin cell 406, the first standard output pin 4062, the second standard output pin 4064, and the third standard output pin 4066 are electrically connected with each other. For example, for the third output pin cell 406, when the first standard output pin 4062, the second standard output pin 4064, and the third standard output pin 4066 are formed on the first metal layer M0, the first standard output pin 4062, the second standard output pin 4064, and the third standard output pin 4066 may be electrically connected with each other by a metal line on the second metal layer M1 or any other higher metal line.

According to some embodiments, the three output pin cells 402, 404, and 406 correspond to three different maximum loading capacitances respectively. Specifically, the first output pin cell 402 corresponds to a first maximum loading capacitance. The second output pin cell 404 corresponds to a second maximum loading capacitance. The third output pin cell 406 corresponds to a third maximum loading capacitance. The second maximum loading capacitance is greater than the first maximum loading capacitance. The third maximum loading capacitance is greater than the second maximum loading capacitance. For example, when the first output pin cell 406 is arranged to be the output pin of a circuit cell, the capacitance induced by the interconnect path or the route connected from the output pin of the circuit cell to the input pin of the next circuit cell may not exceed the maximum loading capacitance of the first output pin cell 402. Otherwise, the output pin of the circuit cell may induce EM phenomenon. The capacitance may be regarded as the parasitic capacitance of the interconnect path or the route. According to some embodiments, when the output pin of a circuit cell is arranged to be the first output pin cell 402, and the output capacitance, which is induced by the interconnect path connected from the output pin of the circuit cell to the input pin of the next circuit cell, of the output pin exceeds the maximum loading capacitance of the first output pin cell 402, the first output pin cell 402 may be replaced by the second output pin cell 404 or the third output pin cell 406 depending on the output capacitance.

Table 1 shows a comparison of the output pin cells 402, 404, and 406 in terms of pin density, cell EM immunity, and EM Max. Cap in accordance with some embodiments.

| Output pin cell | Pin density | Cell EM immunity | EM Max. Cap. |
|---|---|---|---|
| First output pin cell 402 | Low | Weak | Small |
| Second output pin cell 404 | Medium | Medium | Medium |
| Third output pin cell 406 | High | Strong | Large |

The pin density may be regarded as the pin number per unit area. The EM Max. Cap is the maximum capacitance of an output pin cell limited by the EM rules. If the loading capacitance of an output pin with an output pin cell exceeds the corresponding maximum capacitance, the output pin of the circuit cell may induce EM phenomenon. Accordingly, the third output pin cell 406 has the strongest EM immunity in comparison to the first output pin cell 402 and the second output pin cell 404. The first output pin cell 402 has the weakest EM immunity.

Figure 5:
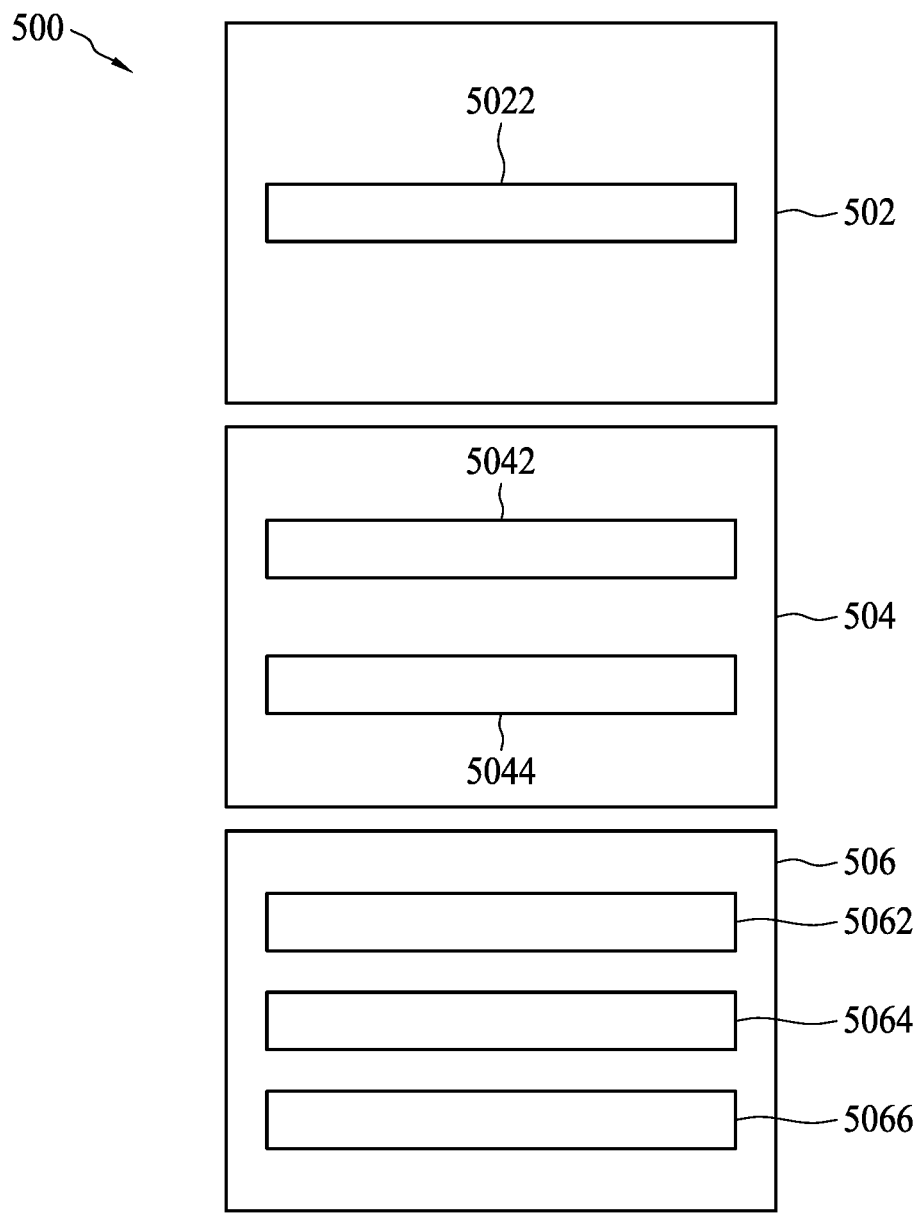
FIG. 5 is a diagram illustrating another library in accordance with some embodiments.

According to some embodiments, when the standard output pins in the output pin cells 402, 404, and 406 are formed on the second metal layer M1, the direction of the standard output pins is the vertical viewing from the top. However, this is not a limitation of the present embodiment. The direction of the standard output pins may be the horizontal viewing from the top. According to some embodiments, when the standard output pins in the output pin cells 402, 404, and 406 are formed on the third metal layer M2, the direction of the standard output pins is the horizontal viewing from the top as shown in FIG. 5. FIG. 5 is a diagram illustrating the library 500 in accordance with some embodiments. The library 500 comprises three different output pin cells 502, 504, and 506. The first output pin cell 502 comprises one standard output pin 5022. The second output pin cell 504 comprises a first standard output pin 5042 and a second standard output pin 5044. The first standard output pin 5042 and the second standard output pin 5044 are two parallel pins. The third output pin cell 506 comprises a first standard output pin 5062, a second standard output pin 5064, and a third standard output pin 5066. The first standard output pin 5062, the second standard output pin 5064, and the third standard output pin 5066 are three parallel pins. Except for the direction, the output pin cells 502, 504, and 506 are arranged to have the similar characteristic with the output pin cells 402, 404, and 406 respectively, thus the detailed description is omitted here for brevity.

Figure 6:
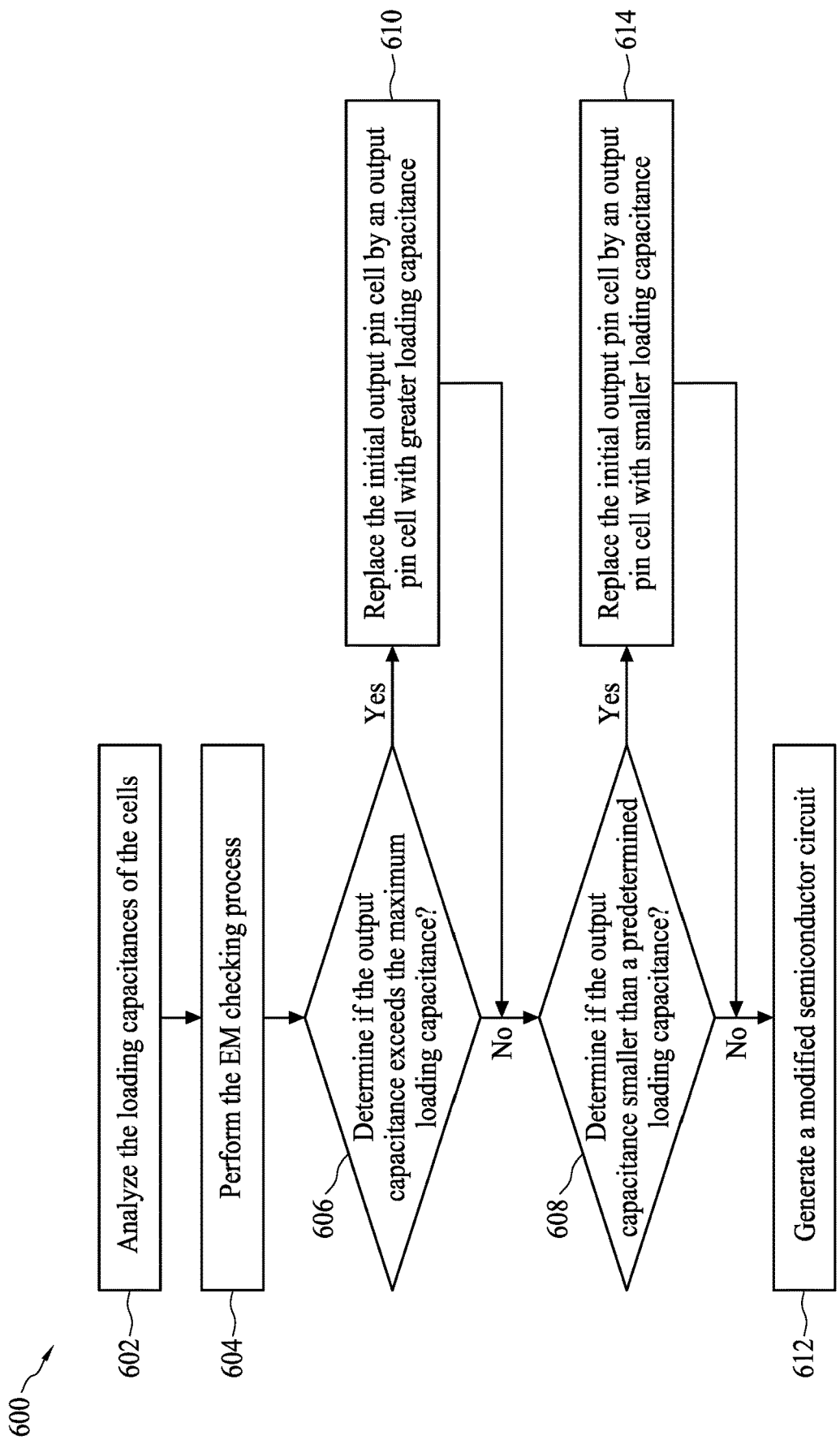
FIG. 6 is a flowchart illustrating a cell replacement process in accordance with some embodiments.

FIG. 6 is a flowchart 600 illustrating a cell replacement process 600 in accordance with some embodiments. The cell replacement process 600 may be performed in the above mentioned cell replacement stage 104. In operation 602, the loading capacitance of the cells in the semiconductor circuit generated in the synthesis stage 102 is analyzed, and a loading capacitance file is generated. The loading capacitance file may comprise the information of output loading or output capacitance of all the cells in the semiconductor circuit. The output capacitance may be an estimated output capacitance on the output pin of one circuit cell connecting with a next cell in the semiconductor circuit. Therefore, the output capacitance may include the parasitic capacitance of the interconnect path connected from the output pin of the circuit cell to the input pin of the next circuit cell.

In operation 604, the EM checking process is performed upon the cells in the semiconductor circuit. During the EM checking process, the loading capacitance file of the semiconductor circuit is loaded. A processor may be used to check if each of the output capacitances of the cells in the semiconductor circuit is out of the predetermined range of the corresponding output pin cell. The corresponding output pin cell may be the initial output pin cell assigned to the output pin of a cell in the semiconductor circuit.

In operation 606, the processor determines if the output capacitances of the cells in the semiconductor circuit exceed the maximum loading capacitances of the corresponding output pin cells.

In operation 610, when the output capacitance of a cell in the semiconductor circuit exceeds the maximum loading capacitance of the initial output pin cell, the initial output pin cell of the cell is replaced by an appropriate output pin cell selected from the above mentioned library 400. For example, when the initial output pin cell of a cell is the first output pin cell 402 and the output capacitance of the cell exceeds the first maximum loading capacitance, and the initial output pin cell of the cell may be replaced by the second output pin cell 404 or the third output pin cell 406 depending on the output capacitance. If the output capacitance of the cell is greater than the first maximum loading capacitance and smaller than the second maximum loading capacitance, then the initial output pin cell is replaced by the second output pin cell 404 from the first output pin cell 402. If the output capacitance of the cell is greater than the second maximum loading capacitance and smaller than the third maximum loading capacitance, then the initial output pin cell is replaced by the third output pin cell 406 from the first output pin cell 402. The operation 610 may continue until no output capacitance in the semiconductor circuit exceeds the maximum loading capacitance of the corresponding output pin cell. When there is no output capacitance in the semiconductor circuit greater than the maximum loading capacitance of the corresponding output pin cell, the EM phenomenon of the semiconductor circuit is alleviated.

Figure 7:
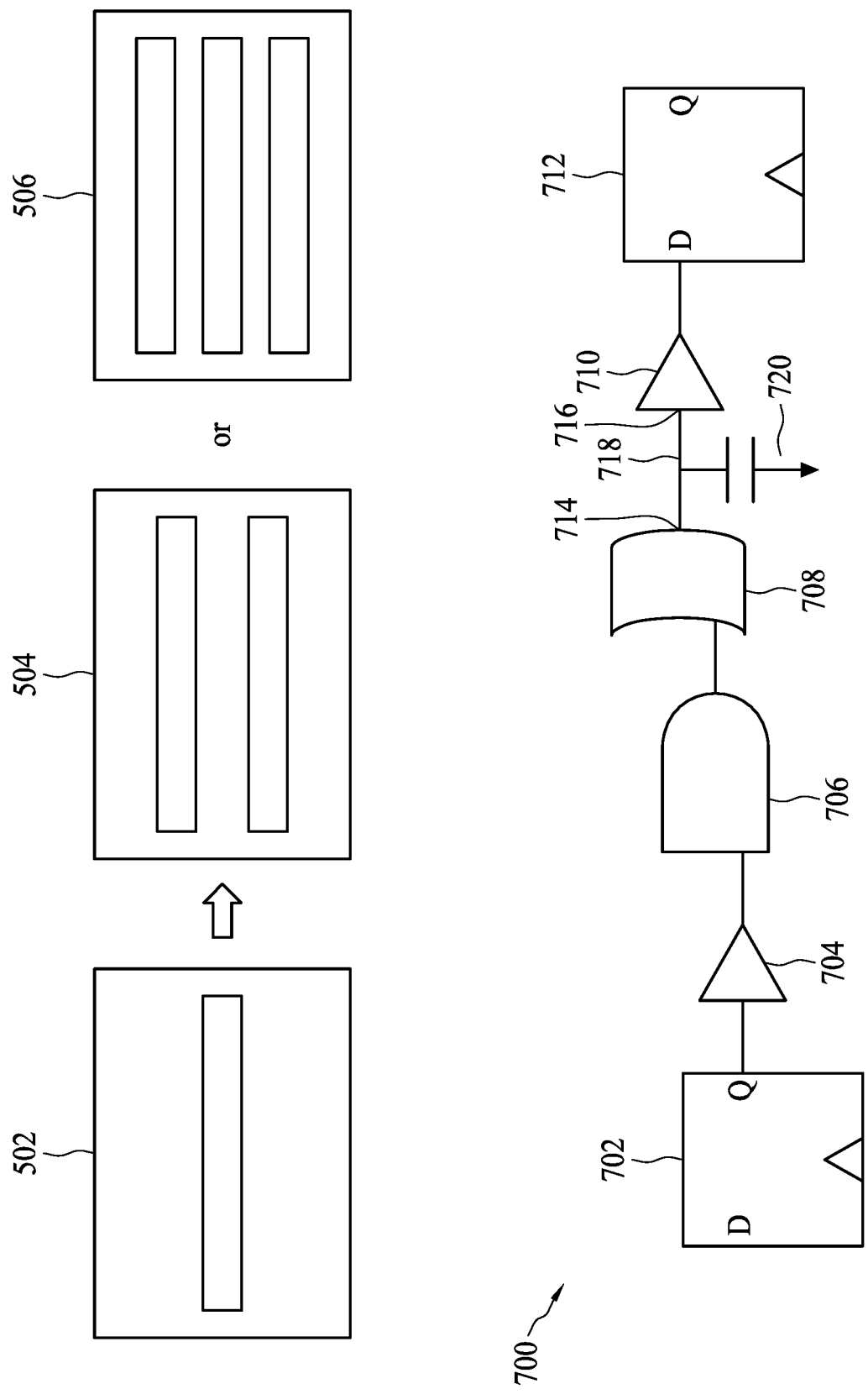
FIG. 7 is a diagram illustrating a circuit portion in a semiconductor circuit in accordance with some embodiments.

FIG. 7 is a diagram illustrating a circuit portion 700 in the semiconductor circuit in accordance with some embodiments. The circuit portion 700 comprises a plurality of circuit cells 702, 704, 706, 708, 710, and 712. The circuit cell 702 may be a latch. The circuit cell 704 may be a buffer. The circuit cell 706 may be an AND gate. The circuit cell 708 may be a OR gate. The circuit cell 710 may be a buffer. The circuit cell 712 may be a latch. The plurality of circuit cells 702, 704, 706, 708, 710, and 712 may be connected in series. The circuit cell 708 is arranged to have an output node 714, and the initial output pin is coupled to the output node 714 of the circuit cell 708. According to some embodiments, the initial output pin is the first output pin cell 502. The circuit cell 710 is arranged to have an input node 716. A route or connecting path 718 is connected between the output pin 714 of the circuit cell 708 and the input pin 716 of the circuit cell 710. When the output capacitance 720, which comprises the parasitic capacitance of the route or connecting path 718, on the output pin 714 of the circuit cell 708 is detected to be greater than the first maximum loading capacitance during the operation 606, the output pin 714 may cause EM violation. Then, the initial output pin of the circuit cell 708 is replaced by the second output pin cell 504 or the third output pin cell 506 to alleviate the EM phenomenon. The detailed description is omitted here for brevity.

In operation 608, the processor determines if the output capacitances of the cells in the semiconductor circuit are smaller than a predetermined loading capacitance when the corresponding output pin cell is the third output pin cell 406.

In operation 614, when the initial output pin cell of a cell in the semiconductor circuit is the third output pin cell 406 and the output capacitance of the cell is smaller than the predetermined loading capacitance, the initial output pin cell of the cell is replaced by the second output pin cell 404 or the first output pin cell 402 depending on the output capacitance. If the output capacitance of the cell is smaller than the second maximum loading capacitance and greater than the first maximum loading capacitance, then the initial output pin cell is replaced by the second output pin cell 404 from the third output pin cell 406. If the output capacitance of the cell is smaller than the first maximum loading capacitance, then the initial output pin cell is replaced by the first output pin cell 402 from the third output pin cell 406. Accordingly, the predetermined loading capacitance may be the second maximum loading capacitance of the second output pin cell 404 or the first maximum loading capacitance of the first output pin cell 402. The operation 614 may continue until all of the output pins of the cells in the semiconductor circuit are assigned to the appropriate output pin cells. When all of the output pins of the cells in the semiconductor circuit are assigned to the appropriate output pin cells, the pin density of the semiconductor circuit is optimized.

Figure 8:
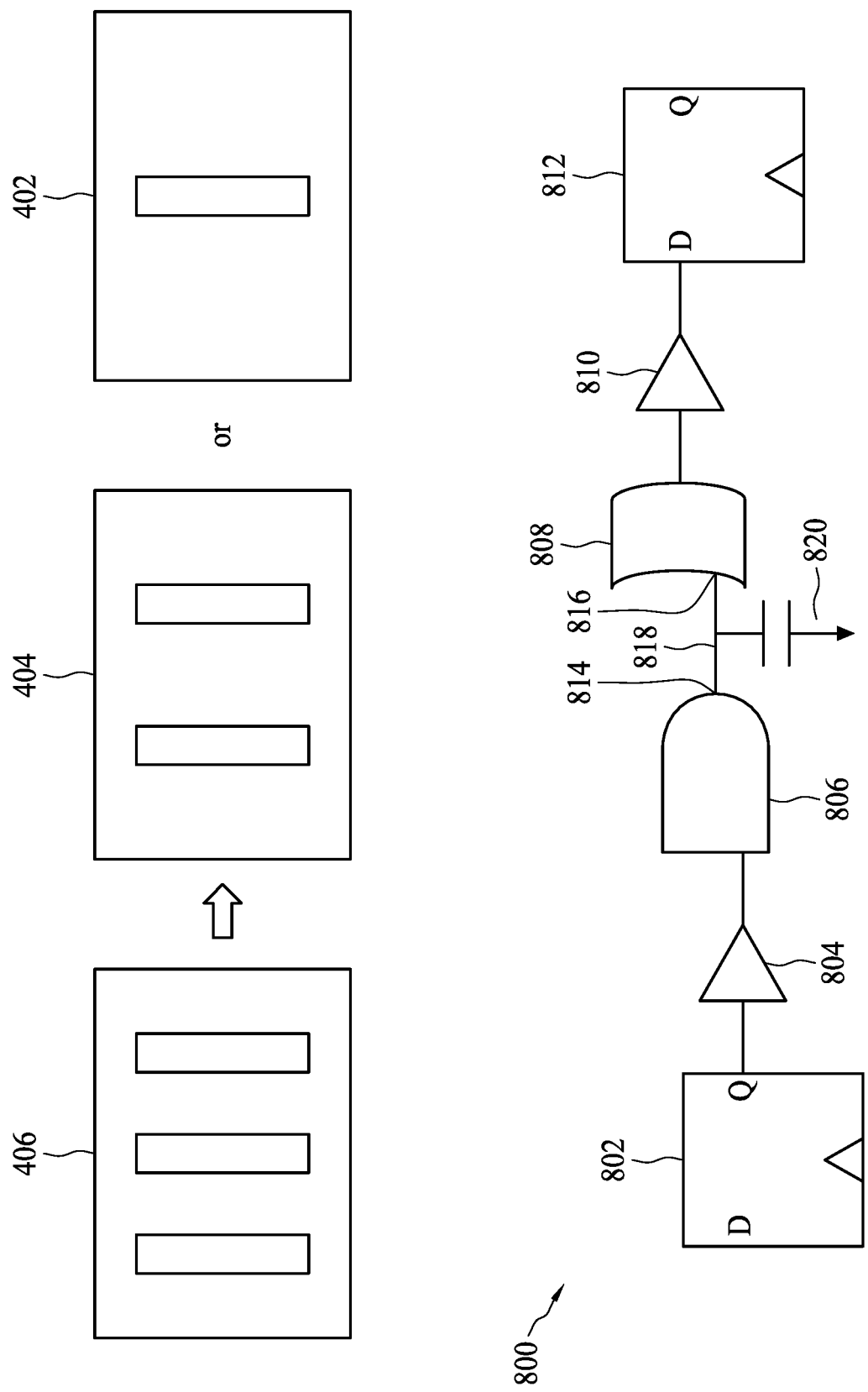
FIG. 8 is a diagram illustrating another circuit portion in a semiconductor circuit in accordance with some embodiments.

FIG. 8 is a diagram illustrating a circuit portion 800 in the semiconductor circuit in accordance with some embodiments. The circuit portion 800 comprises a plurality of circuit cells 802, 804, 806, 808, 810, and 812. The circuit cell 802 may be a latch. The circuit cell 804 may be a buffer. The circuit cell 806 may be an AND gate. The circuit cell 808 may be a OR gate. The circuit cell 810 may be a buffer. The circuit cell 812 may be a latch. The plurality of circuit cells 802, 804, 806, 808, 810, and 812 may be connected in series. The circuit cell 806 is arranged to have an output node 814, and the initial output pin is coupled to the output node 814 of the circuit cell 806. According to some embodiments, the initial output pin of the circuit cell 806 is the third output pin cell 406. The circuit cell 808 is arranged to have an input node 816. A route or connecting path 818 is connected between the output pin 814 of the circuit cell 806 and the input pin 816 of the circuit cell 808. When the output capacitance 820, which comprises the parasitic capacitance of the route or connecting path 818, on the output pin 814 of the circuit cell 808 is detected to be smaller than the predetermined loading capacitance during the operation 608, then using the third output pin cell 406 to be the output pin 814 may waste the pin layer routing resource between the circuit cell 806 and the circuit cell 808. Then, the initial output pin 814 of the circuit cell 808 is replaced by the second output pin cell 404 or the first output pin cell 402 to save the pin layer routing resource and to achieve better Power Performance Area (PPA). The detailed description is omitted here for brevity.

In operation 612, a modified semiconductor circuit is generated, in which the EM phenomenon of the modified semiconductor circuit is alleviated and the pin density of the modified semiconductor circuit is optimized.

Figure 9:
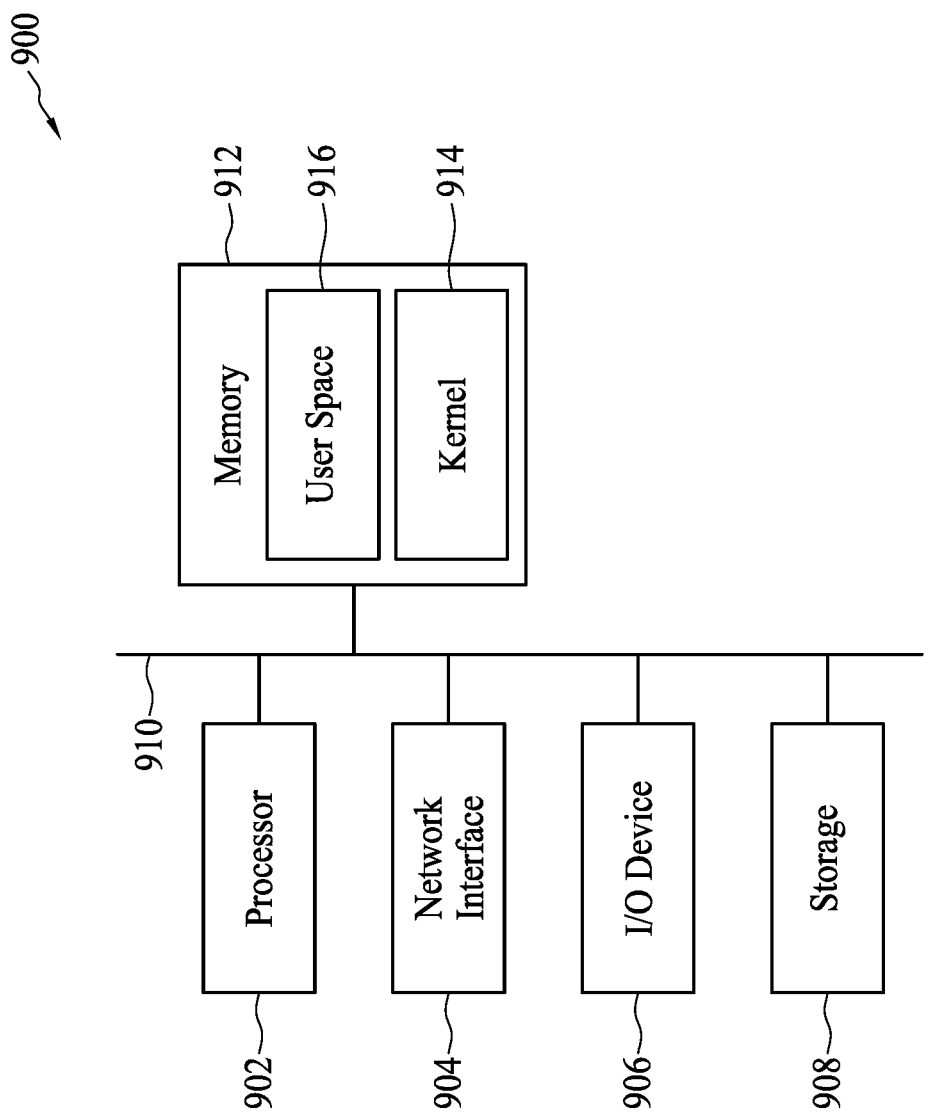
FIG. 9 is a diagram of a hardware system for implementing an EM checking process and cell replacement process in accordance with some embodiments.

FIG. 9 is a diagram of a hardware system 900 for implementing an EM checking process and cell replacement process (e.g. the cell replacement stage 104) to generate a modified semiconductor circuit (e.g. 700 or 800) in accordance with some embodiments. The system 900 includes at least one processor 902, a network interface 904, an input and output (I/O) device 906, a storage 908, a bus 910, and a memory 912. The bus 910 couples the network interface 904, the I/O device 906, the storage 908 and the memory 912 to the processor 902.

In some embodiments, the memory 912 comprises a random access memory (RAM) and/or other volatile storage device and/or read only memory (ROM) and/or other non-volatile storage device. The memory 912 includes a kernel 914 and user space 916, configured to store program instructions to be executed by the processor 902 and data accessed by the program instructions.

In some embodiments, the network interface 904 is configured to access program instructions and data accessed by the program instructions stored remotely through a network. The I/O device 906 includes an input device and an output device configured for enabling user interaction with the system 900. The input device comprises, for example, a keyboard, a mouse, etc. The output device comprises, for example, a display, a printer, etc. The storage device 908 is configured for storing program instructions and data accessed by the program instructions. The storage device 908 comprises, for example, a magnetic disk and an optical disk.

In some embodiments, when executing the program instructions, the processor 902 is configured to perform the operations of the EM checking process and cell replacement process as described with reference to FIG. 1, FIG. 2, FIG. 3, or FIG. 6.

In some embodiments, the program instructions are stored in a non-transitory computer readable recording medium such as one or more optical disks, hard disks and non-volatile memory devices.

Figure 10:
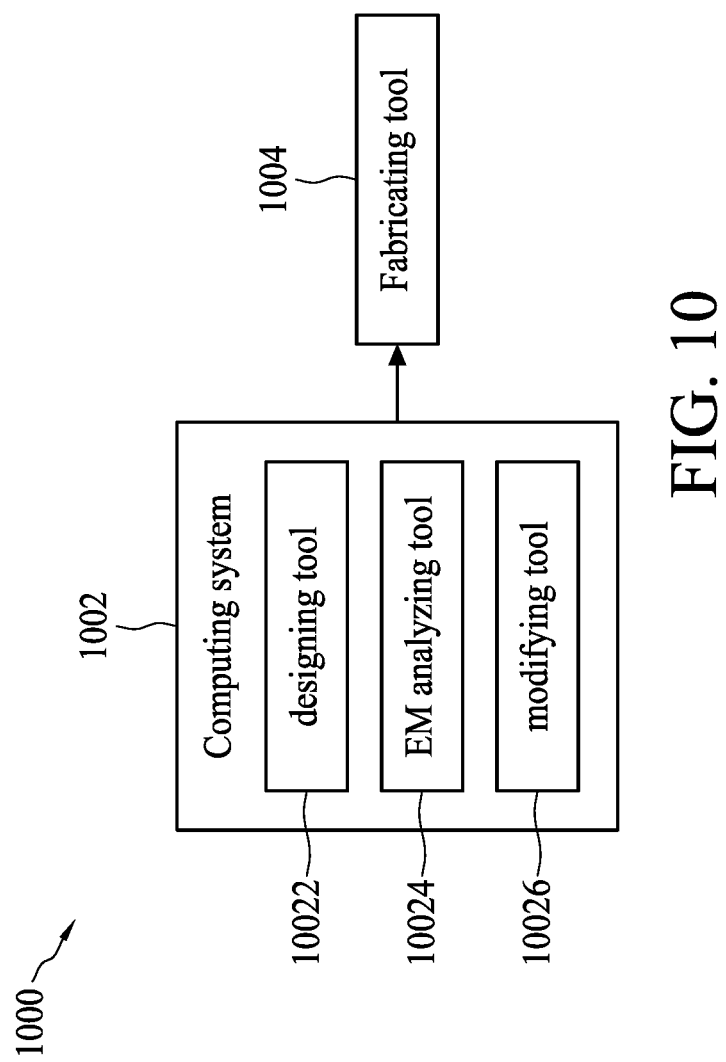
FIG. 10 is a diagram of a system for fabricating a modified semiconductor circuit in accordance with some embodiments.

FIG. 10 is a diagram of a system 1000 for fabricating the modified semiconductor circuit (e.g. 700 or 800) in accordance with some embodiments. The system 1000 comprises a computing system 1002 and a fabricating tool 1004. The computing system 1002 is arranged to perform the operations of the EM checking process and cell replacement process as described with reference to FIG. 1, FIG. 2, FIG. 3, or FIG. 6 to generate the circuit layout of the modified semiconductor circuit (e.g. 700 or 800). According to some embodiments, the hardware of the computing system 1002 may similar to the hardware system 900. In some embodiments, the computing system 1002 may be arranged to execute a designing tool 10022, an EM analyzing tool 10024, and a modifying tool 10026 installed therein. In one or more embodiments, the computing system may function as a processing tool or an EDA tool.

The designing tool 10022 is arranged to provide a semiconductor circuit (e.g. 700 or 800) and a library (e.g. 400 or 500) having a plurality of output pin cells (e.g. 402-406 or 502-506) with different pin configurations. The library (e.g. 400 or 500) may be pre-stored in the storage 908. The processor 910 may select an appropriate output pin cell from the storage 908.

The EM analyzing tool 10024 is arranged to analyze an EM data of an output pin of a circuit cell to determine if the output pin induces EM phenomenon. For brevity, the EM analyzing tool 10024 may analyze the EM data of the output pin using the operations 602, 604, 606, and/or 608 described in FIG. 6.

The modifying tool 10026 is arranged to modify the output pin of a circuit cell for generating a modified circuit cell having a modified output pin when the EM analyzing tool 10024 indicates that the output pin induces EM phenomenon. For brevity, the modifying tool 10026 may modify the output pin using the operations 610, 612, and/or 614 described in FIG. 6.

The fabricating tool 1004 may be a cluster tool for fabricating an integrated circuit (e.g. 700 or 800). The cluster tool may be a multiple reaction chamber type composite equipment which includes a polyhedral transfer chamber with a wafer handling robot inserted at the center thereof, a plurality of process chambers positioned at each wall face of the polyhedral transfer chamber; and a load lock chamber installed at a different wall face of the transfer chamber. At the fabrication stage, at least one photomask is used, for example, for one patterning operation for forming a feature of ICs, such as gate lines of transistors, source or drain regions for the transistors, metal lines for interconnects and vias for the interconnects, on a wafer.

Briefly, the above embodiments provide an EM-aware cell replacement technique during the Synthesis and APR flow. Each output pin of the cells is assigned to the appropriate output pin cell based on the loading capacitance to alleviate the EM phenomenon and obtain better PPA result with reduced pin density.

According to some embodiments, a method of forming a semiconductor device is provided. The method comprises: providing a first circuit having a plurality of circuit cells, wherein the plurality of circuit cells includes a first circuit cell including a first pin cell, and the first pin cell includes a first number of output pin extending horizontally from a top view; wherein providing the first circuit having the plurality of circuit cells includes: providing a connecting path connected from the first pin cell of the first circuit cell to a second circuit cell; performing an Electromigration (EM) checking process upon the first circuit by incorporating a first parasitic capacitance of the first pin cell and a second parasitic capacitance of the connecting path into the EM checking process to determine whether the loading capacitance of the first pin cell is larger than a first predetermined capacitance, wherein the first parasitic capacitance and the second parasitic capacitance are included in a loading capacitance file of the first circuit; replacing the first pin cell by a second pin cell for generating a second circuit when the loading capacitance is larger than the first predetermined capacitance, wherein the second pin cell different from the first pin cell includes a second number of output pin extending horizontally from the top view; and generating the semiconductor device according to the second circuit.

According to some embodiments, a method of forming a semiconductor device is provided. The method comprises: providing a first circuit having a plurality of circuit cells, wherein the plurality of circuit cells includes a first circuit cell including a first pin cell, and the first pin cell includes a first number of output pin extending vertically from a top view; wherein providing the first circuit having the plurality of circuit cells includes: providing a connecting path extending from the first pin cell of the first circuit cell to a second circuit cell; performing an Electromigration (EM) checking process upon the first circuit by incorporating a first parasitic capacitance of the first pin cell and a second parasitic capacitance of the connecting path into the EM checking process to determine whether a loading capacitance including the first parasitic capacitance of the first pin cell and the second parasitic capacitance of the connecting path is smaller than a predetermined capacitance; replacing the first pin cell by a second pin cell for generating a second circuit when the loading capacitance is smaller than the predetermined capacitance, wherein the second pin cell includes a second number of output pin extending vertically from the top view; and generating the semiconductor device according to the second circuit.

According to some embodiments, a system is provided. The system comprises at least one processor, configured to execute program instructions which configure the at least one processor as a computing tool that perform operations comprising: at least one processor, configured to execute program instructions which configure the at least one processor as a computing tool that performs a cell replacement operation comprising: providing, by a designing tool, a first circuit having a plurality of circuit cells, wherein the plurality of circuit cells includes a first circuit cell including a first pin cell, and the first pin cell includes a first number of output pin extending horizontally from a top view; wherein providing the first circuit having the plurality of circuit cells includes: providing a connecting path connected from the first pin cell of the first circuit cell to a second circuit cell; performing an Electromigration (EM) checking process upon the first circuit by incorporating a first parasitic capacitance of the first pin cell and a second parasitic capacitance of the connecting path into the EM checking process to determine whether a loading capacitance including the first parasitic capacitance of the first pin cell and the second parasitic capacitance of the connecting path is larger than a first predetermined capacitance, wherein the first parasitic capacitance and the second parasitic capacitance are included in a loading capacitance file of the first circuit; and replacing, by a modifying tool, the first pin cell by a second pin cell for generating a second circuit when the loading capacitance is larger than the first predetermined capacitance, wherein the second pin cell different from the first pin cell includes a second number of output pin extending horizontally from the top view; and generating, by a fabricating tool, the semiconductor device according to the second circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a semiconductor device, the method comprising:
    providing a first circuit having a plurality of circuit cells, wherein the plurality of circuit cells includes a first circuit cell including a first pin cell, and the first pin cell includes a first number of output pins extending horizontally from a top view; wherein providing the first circuit having the plurality of circuit cells includes:
        providing a connecting path connected from the first pin cell of the first circuit cell to a second circuit cell;
        performing an Electromigration (EM) checking process upon the first circuit by incorporating a first parasitic capacitance of the first pin cell and a second parasitic capacitance of the connecting path into the EM checking process to determine whether the loading capacitance of the first pin cell is larger than a first predetermined capacitance, wherein the first parasitic capacitance and the second parasitic capacitance are included in a loading capacitance file of the first circuit;

replacing the first pin cell by a second pin cell for generating a second circuit when the loading capacitance is larger than the first predetermined capacitance, wherein the second pin cell is different from the first pin cell and includes a second number of output pins extending horizontally from the top view; and generating the semiconductor device according to the second circuit.

2. The method of claim 1, wherein the second number of output pins are disposed on a conductive layer and are electrically connected with each other.

3. The method of claim 1, wherein the second number is greater than the first number.

4. The method of claim 1, wherein the second pin cell comprises double pins or triple pins.

5. The method of claim 1, further comprising:
analyzing the loading capacitance on a third pin cell of a third circuit cell connected to a fourth circuit cell in the plurality of circuit cells to determine if the loading capacitance of the third pin cell is smaller than a second predetermined capacitance; and
replacing the third pin cell by a fourth pin cell for generating the second circuit when the loading capacitance is smaller than the second predetermined capacitance, wherein the fourth pin cell is different from the third pin cell;
wherein the third pin cell includes a third number of output pins extending horizontally from the top view, and the fourth pin cell includes a fourth number of output pins extending horizontally from the top view.

6. The method of claim 5, wherein the fourth number is smaller than the third number.

7. The method of claim 5, wherein the fourth pin cell comprises a single pin or double pins.

8. The method of claim 5, further comprising:
providing a connecting path connected from the third pin cell of the third circuit cell to the fourth circuit cell; and
wherein the loading capacitance comprises a first parasitic capacitance of the third pin cell and a second parasitic capacitance of the connecting path.

9. The method of claim 5, wherein the fourth number of output pins are disposed on a conductive layer and are electrically connected with each other.

10. A method of forming a semiconductor device, the method comprising:
providing a first circuit having a plurality of circuit cells, wherein the plurality of circuit cells includes a first circuit cell including a first pin cell, and the first pin cell includes a first number of output pins extending vertically from a top view; wherein providing the first circuit having the plurality of circuit cells includes:
providing a connecting path extending from the first pin cell of the first circuit cell to a second circuit cell;
performing an Electromigration (EM) checking process upon the first circuit by incorporating a first parasitic capacitance of the first pin cell and a second parasitic capacitance of the connecting path into the EM checking process to determine whether a loading capacitance including the first parasitic capacitance of the first pin cell and the second parasitic capacitance of the connecting path is smaller than a predetermined capacitance;
replacing the first pin cell by a second pin cell for generating a second circuit when the loading capacitance is smaller than the predetermined capacitance, wherein the second pin cell includes a second number of output pins extending vertically from the top view; and
generating the semiconductor device according to the second circuit.

11. The method of claim 10, wherein the second number of output pins are disposed on a conductive layer and are electrically connected with each other.

12. The method of claim 10, wherein the second number is smaller than the first number.

13. The method of claim 10, wherein the second pin cell comprises a single pin cell or double pin cells.

14. The method of claim 10, further comprising:
analyzing the loading capacitance on a third pin cell of a third circuit cell connected to a fourth circuit cell in the plurality of circuit cells to determine if the loading capacitance of the third pin cell is greater than a second predetermined capacitance; and
replacing the third pin cell by a fourth pin cell for generating the second circuit when the loading capacitance is greater than the second predetermined capacitance, wherein the fourth pin cell is different from the third pin cell;
wherein the third pin cell includes a third number of output pins extending vertically from the top view, and the fourth pin cell includes a fourth number of output pins extending vertically from the top view.

15. The method of claim 14, wherein the fourth number is greater than the third number.

16. The method of claim 14, wherein the fourth pin cell comprises double pins or triple pins.

17. A system, comprising:
at least one processor, configured to execute program instructions which configure the at least one processor as a computing tool that performs a cell replacement operation comprising:
providing, by a designing tool, a first circuit having a plurality of circuit cells, wherein the plurality of circuit cells includes a first circuit cell including a first pin cell, and the first pin cell includes a first number of output pins extending horizontally from a top view;
wherein providing the first circuit having the plurality of circuit cells includes:
providing a connecting path connected from the first pin cell of the first circuit cell to a second circuit cell;
performing an Electromigration (EM) checking process upon the first circuit by incorporating a first parasitic capacitance of the first pin cell and a second parasitic capacitance of the connecting path into the EM checking process to determine whether a loading capacitance including the first parasitic capacitance of the first pin cell and the second parasitic capacitance of the connecting path is larger than a first predetermined capacitance, wherein the first parasitic capacitance and the second parasitic capacitance are included in a loading capacitance file of the first circuit; and
replacing, by a modifying tool, the first pin cell by a second pin cell for generating a second circuit when the loading capacitance is larger than the first predetermined capacitance, wherein the second pin cell is different from the first pin cell and includes a second number of output pins extending horizontally from the top view; and generating, by a fabricating tool, the semiconductor device according to the second circuit.

18. The system of claim 17, wherein the second number of output pins are disposed on a conductive layer and electrically connected with each other.

19. The system of claim 17, wherein the second number is greater than the first number.

20. The system of claim 17, wherein the second pin cell comprises double pins or triple pins.

* * * * *